Sept. 28, 1937.  W. H. WELCH  2,094,511
RETREADING OF MOTOR AND LIKE WHEEL TIRES
Filed Nov. 18, 1936   2 Sheets-Sheet 1
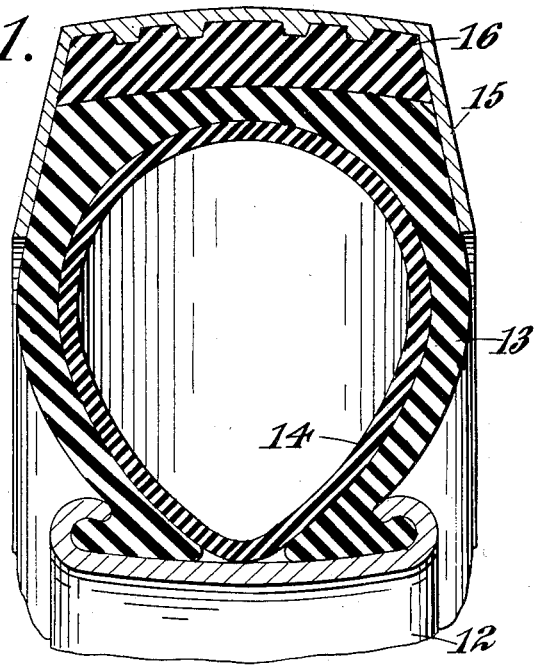
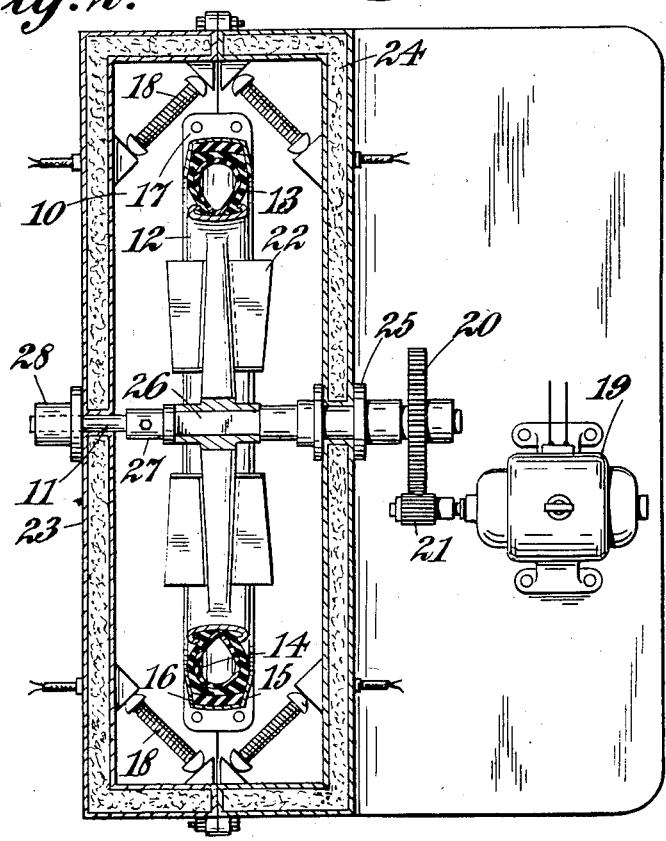
Inventor
Walter H. Welch
Attorneys Sept. 28, 1937.   W. H. WELCH   2,094,511
RETREADING OF MOTOR AND LIKE WHEEL TIRES
Filed Nov. 18, 1936   2 Sheets—Sheet 2

Inventor
Walter H. Welch
by Wilkinson & Mawhinney
Attorneys.

Patented Sept. 28, 1937

2,094,511

UNITED STATES PATENT OFFICE 2,094,511

RETREADING OF MOTOR AND LIKE WHEEL TIRES

Walter Henry Welch, Poole, Dorset, England

Application November 18, 1936, Serial No. 111,503
In Great Britain November 5, 1935

3 Claims. (Cl. 18—6)

This invention relates to the retreading of motor and like wheel tires and has for its object to provide an improved apparatus which is inexpensive and simple but satisfactory in operation.

In the apparatus hitherto used for retreading motor tires and the like, the moulds for the new treads have been very expensive, owing to the fact that means for applying heat has been incorporated in them, and the process moreover has been disadvantageous in that the heating treatment of the new tread has also involved the heating of the old carcase which has suffered thereby, and these disadvantages are obviated by the present invention according to which apparatus for retreading tires comprises means for supporting the carcase to be retreaded, and a simple mould for the new tread, for example, of thin sheet metal, together with means spaced away from the mould for supplying heat to it by radiation to the outer surface of the mould.

According to another feature of this invention the apparatus comprises the combination of a rim or wheel like structure, to carry an inflatable inner tube, whereon the carcase can be mounted, a thin sheet metal mould adapted to be secured around the carcase to enclose the material of the new tread, and heating elements spaced away from the mould to supply heat to it.

According to another feature of the invention the wheel-like structure aforesaid is adapted to be rotated, and the heating elements are spaced apart around it; the rotation of the mould ensures uniform heating of all parts of it, and moreover assists in keeping the carcase cool.

Specific embodiment of the present invention will now be described with reference to the accompanying drawings, of which:

Figure 1 shows part of the apparatus having mounted in position a carcase to be retreaded;

Figure 2 shows a plan view, partially in section, of one form of the complete apparatus;

Figure 3:
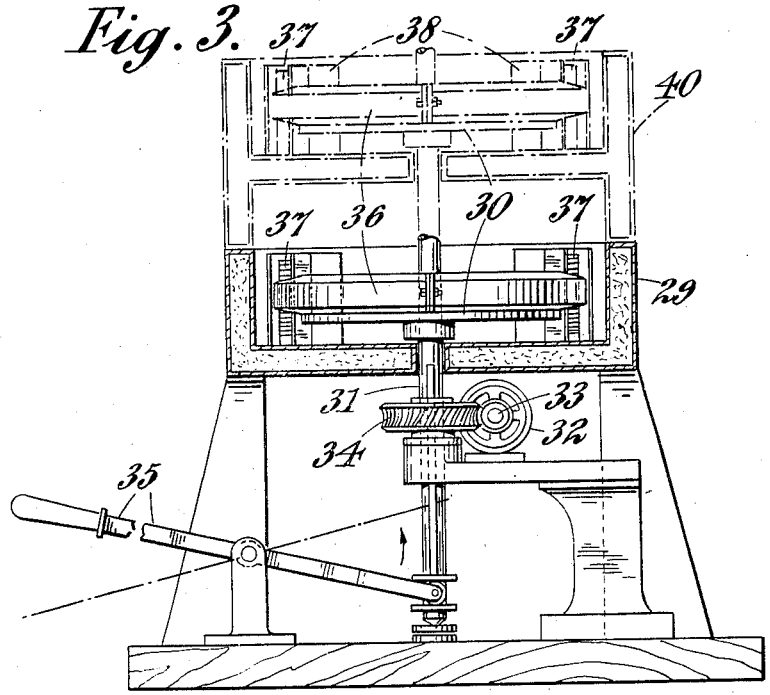
Figure 3 is an elevation in section of an alternative form of apparatus.

As shown in Figures 1 and 2, an insulated chamber 10 has mounted within it a shaft 11 whereon there is mounted a wheel 12, which supports the carcase 13 of the tire to be retreaded and an inner tube 14 is provided on the wheel so that it can be inflated to any desired pressure such as is required in the treatment of the new tread.

Thin sheet metal moulds 15, which are rolled or otherwise inexpensively formed to the desired section of the new tread, are secured around the carcase to enclose the material 16 of the new tread. The mould is made in two circumferential parts each provided with upstanding plates 17 so that they can be clamped together to withstand the pressure applied by the inflation of the inner tube 14.

Instead of using thin sheet metal moulds, it may in some cases be required to use the moulds having a pattern which cannot conveniently be reproduced in sheet metal, and in this case the mould is preferably made up in a series of arcuate die-cast portions which link together in the form of a chain to constitute the complete mould; there may be provided a series of sections all of the same length, and a series of sections of different lengths, any one or combination of which can be used to complete a mould of any desired circumferential length. When assembled the moulds may be compressed by a flexible steel band arranged circumferentially around them and subjected to the necessary tension; for example, the steel band may be slightly less in length than the required circumference and formed with hooked ends which are drawn towards one another with the necessary pressure and are connected by a double-ended hook member to retain the band in place.

In some instances it may be desirable to use perfectly plain moulds and to form the desired pattern on the tread by cutting grooves in it in the way ordinarily used for reforming non-skid treads.

In each of the four corners of the chamber 10, there is provided an electric heating element 18, which is adapted to radiate heat to the outer surface of the moulds 15, and in order that all parts of the mould may be heated uniformly the wheel is arranged to be rotated by means of an electric motor 19, connected in series with the elements 18, which drives the shaft 11 through gears 20 and 21.

In order to ensure that the carcase 13 is not over-heated vanes 22 are secured to the spokes of the wheel 12 so as to circulate air around the inner periphery of the wheel as it rotates. It is therefore possible by controlling the heating elements and the speed of rotation of the wheel to obtain any desired conditions of temperature for the treatment of the new tread.

The chamber 10 is constituted by sections 23 and 24 detachably secured together so that the section 23 can readily be removed, together with its associated heating elements, for inserting or removing the wheel. The shaft 11 is permanently carried in a bearing 25 on the section 24 and is provided with a non-circular portion 26 for engaging the hub of the wheel. A distance-piece 27 and an end-plate 28 are readily removable from the shaft to permit the wheel to be taken out of the chamber.

It will be appreciated that other heating units, for example, steam-heated units or gas-jets may be used in place of the electric elements 18. When steam-heating is used, a jet of steam from one or more of the heaters may be allowed to play on vanes formed on the mould to rotate it as soon as the steam is applied. It is also possible to heat the mould electrically by induction, the heating elements then comprising the primary windings of a transformer whereby the short-circuited secondary winding is constituted by the mould itself.

When steam heating is used as above described with a steam jet for driving the wheel and mould, a certain amount of heat is imparted to the mould by the condensation of the steam thereon, but the water of condensation is thrown off centrifugally by the rotation of the wheel.

Figure 4:
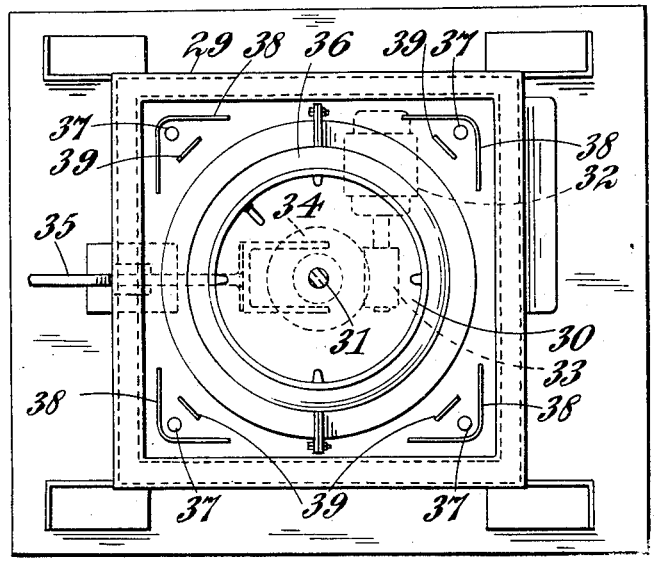
Figure 4 is a plan of Figure 3.

In the alternative embodiment of the apparatus illustrated in Figures 3 and 4, the insulated chamber 29 is arranged horizontally, and has an open top; within it there is mounted a turntable 30 on the vertical spindle 31 which is driven by an electric motor 32 through a worm gear 33, 34. The spindle 33 is arranged to be movable longitudinally through the worm wheel 34, for example, by means of the lever 35 so as to lift the turntable to the top of the casing 29 so that it is readily accessible.

On this turntabe 30 there is mounted a rim 36 adapted to receive the carcase which is to be retreaded and an inflatable inner tube for it.

In each of the corners of the casing 29 there is mounted an electric heating element or radiator 37, with a reflector 38 to direct the radiant heat on to the carcase; a shield 39 may be provided between the radiator 27 and the carcase to prevent direct radiation and ensuring a more uniform distribution of the heat by causing it all to be reflected from the reflector 38.

If cooling of the inner part of the carcase, or the rim is required, it may be effected by a separate electrically driven fan or the fan may be driven by the motor 32.

Means may be provided for adjusting the heating elements towards and away from the carcase which is being treated, to provide for variations in the heating which is to be effected, or for different sizes of tires which are to be retreaded.

The open top of the casing 29 may be provided with a removable lid, or other similar casing 40 containing a turntable which may be arranged to be stacked on top, all of the turntables receiving their drive from the motor 32 through the spindle 31; in this way it is possible to treat a large number of tires simultaneously.

It will be appreciated that the invention is not limited to any specific mechanical construction of the parts concerned since many variations are possible without departing from the scope of this invention as above set forth.

I claim:

1. A tire retreading means comprising a casing, a shaft rotatably carried by said casing, means for rotating said shaft, a wheel secured to said shaft within the casing, a rim carried by said wheel and adapted to receive a tire to be retreaded, a mold to receive the material to be vulcanized to the tire, a plurality of heating members disposed in the casing about the mold, and radial fins carried by said wheel.

2. A tire retreading means comprising a casing, a shaft rotatably carried by said casing, means for rotating said shaft, a wheel secured to said shaft within the casing, a rim carried by said wheel and adapted to receive a tire to be retreaded, a mold to receive the material to be vulcanized to the tire, heating means fixedly disposed in the casing, and a plurality of fins carried by said wheel.

3. A tire retreading means comprising a casing, a shaft rotatably carried by said casing, means for rotating said shaft, a wheel on the shaft within the casing, means detachably securing said wheel on said shaft, a rim carried by said wheel and adapted to receive a tire to be retreaded, a mold to receive the material to be vulcanized to the tire, heating means fixedly disposed in the casing, and means carried by said wheel to circulate air within the casing.

WALTER HENRY WELCH.